(12) United States Patent
Zehnder et al.

(10) Patent No.: US 11,429,087 B2
(45) Date of Patent: Aug. 30, 2022

(54) METHOD AND MANUFACTURING PLANT FOR PRODUCING A PRODUCT

(71) Applicant: B&R INDUSTRIAL AUTOMATION GMBH, Eggelsberg (AT)

(72) Inventors: Thomas Zehnder, Wil (CH); Stefan Huber, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 17/077,409

(22) Filed: Oct. 22, 2020

(65) Prior Publication Data

US 2021/0124337 A1 Apr. 29, 2021

(30) Foreign Application Priority Data

Oct. 23, 2019 (AT) .............................. A50916/2019

(51) Int. Cl.
*G05B 19/418* (2006.01)

(52) U.S. Cl.
CPC ... *G05B 19/41865* (2013.01); *G05B 19/4183* (2013.01); *G05B 19/4185* (2013.01); *G05B 19/4189* (2013.01)

(58) Field of Classification Search
CPC .......... G05B 19/41865; G05B 19/4183; G05B 19/4185; G05B 19/4189
USPC ........................................................ 700/79
See application file for complete search history.

(56) References Cited

U.S. PATENT DOCUMENTS

| 7,941,301 | B2 | 5/2011 | Pulfer |
| 2010/0138017 | A1* | 6/2010 | Vrba ................... G05B 19/4188 700/97 |
| 2012/0239169 | A1 | 9/2012 | Smith et al. |
| 2017/0206127 | A1* | 7/2017 | Thompson ......... G05B 23/0275 |

(Continued)

FOREIGN PATENT DOCUMENTS

| CN | 105243237 | * | 1/2016 |
| DE | 10 2014 006 699 | | 6/2015 |
| EP | 2 500 787 | | 9/2012 |

(Continued)

OTHER PUBLICATIONS

Austria Search Report conducted in counterpart Austria Appln. No. A 50916/2019 (Sep. 18, 2020).

*Primary Examiner* — Hien D Khuu
(74) *Attorney, Agent, or Firm* — Greenblum & Bernstein, P.L.C.

(57) ABSTRACT

In order to improve the planning and implementation of the manufacture of a product in a manufacturing plant, the manufacturing plant is modeled via a machine network plan modeling the manufacturing plant as a network of manufacturing nodes, and the product to be manufactured being modeled via a product synthesis plan modeling the hierarchical structure of the product in the form of a tree of product synthesis nodes. The machine network plan and the product synthesis plan are linked with each other to form a manufacturing sequence, in which a manufacturing node of the machine network plan is selected for each operation node of the product synthesis plan, which selected manufacturing node carries out the manufacturing process to be carried out at the relevant operation node. The manufacturing sequence is carried out in the manufacturing plant via a system controller in order to produce the product.

14 Claims, 5 Drawing Sheets

(56) References Cited

U.S. PATENT DOCUMENTS

2019/0107828 A1    4/2019  Reichle et al.
2019/0129393 A1*   5/2019  Feiten ................ G05B 19/4188

FOREIGN PATENT DOCUMENTS

| EP | 3506133 | * | 7/2019 |
| WO | 00/63751 | | 10/2000 |
| WO | 2004/083982 | | 9/2004 |
| WO | WO 2018/001650 | * | 1/2018 |

* cited by examiner

METHOD AND MANUFACTURING PLANT FOR PRODUCING A PRODUCT

CROSS-REFERENCE TO RELATED APPLICATIONS

This application claims priority under 35 U.S.C. § 119(a) to Austria Application No. A 50916/2019 filed Oct. 23, 2019, the disclosure of which is expressly incorporated by reference herein in its entirety.

BACKGROUND

1. Field of the Invention

The present invention relates to a method for producing a product in a manufacturing plant, the product being produced in the manufacturing plant in a number of manufacturing stations and being moved between successive manufacturing stations by transport units. The invention relates also to a corresponding manufacturing plant.

2. Discussion of Background Information

Currently, products are usually manufactured in manufacturing plants. In such plants, a large number of manufacturing stations are passed through before the product is finished. It is already standard nowadays for each product to be treated and manufactured individually (batch size one). In order to manufacture the (intermediate) product by means of the manufacturing plant, the transport route of the product through the individual manufacturing stations has to be planned. The selection of the manufacturing stations from the available manufacturing stations, and of the transport route of the product through the individual manufacturing stations, is planned and programmed by an application developer. Current topologies of a manufacturing plant in the field of manufacturing are always lines, i.e. such that the (intermediate) product is passed serially through the successive manufacturing stations. An exception to this is the parallelization of manufacturing processes in order to achieve a load distribution, in which case the parallel lines then typically carry out identical manufacturing processes. The manufacturing stations and transport routes between said manufacturing stations are controlled by a line controller which is programmed by hand by the application developer such that, at the end, the products which are desired are produced. However, this procedure is very time-consuming, not very flexible and always requires a programmer.

In particular in the case of complex products which have many manufacturing steps distributed over different manufacturing stations, the programming of the manufacturing plant quickly becomes very complex and unforeseeable problems can arise during the implementation of the programmed sequence, for example bottlenecks, which lead to products accumulating at certain locations in the manufacturing plant or manufacturing stations being temporarily unproductive. Such bottlenecks are, of course, undesired. The detection of bottlenecks in a manufacturing line is currently achieved by means of complex simulations. The bottlenecks are then resolved by the complex change to the application logic by the application developer, or by the costly addition of parallel manufacturing lines, or by replacing the manufacturing stations or transport systems with more efficient machines.

A manufacturing line programmed in this way is also inflexible because it is strongly connected to the product by the programming. The switching of the manufacturing plant from one product to another has to be reprogrammed manually in a complex manner. If a part of the manufacturing line fails, for example a transport route or a manufacturing station, this can lead to a stoppage of the entire manufacturing line and thus to high manufacturing losses.

SUMMARY

A problem addressed by the present invention is therefore that of improving the planning and implementation of the manufacture of a product in a manufacturing plant.

This problem is solved by the features of the independent claims. As a result of the procedure according to the invention, it is no longer necessary to manually program the plant controller. In addition, machine networks of the manufacturing installation that are of any complexity can be used, because the machine network can be fully utilized as a result of the linkage. This can be done for each individual product, thus increasing manufacturing flexibility. In addition, an optimum product flow through the machine network, the prioritization of products in production and/or a utilization distribution of the manufacturing nodes in the machine network can be achieved in a simple manner by means of the linking. Rigid production lines for a product, which have been conventional up to now, are left, and the manufacture is made more flexible at the product level.

A further substantial advantage of the invention is that the production of the product can also be simulated. A real product therefore does not have to be manufactured, but it is also possible to only produce a fictitious product. Suitable simulation models of the manufacturing nodes of the machine network plan are used to simulate production. This makes it possible for new manufacturing plants to be better planned with regard to the manufacture of specific products (product synthesis plans), or for existing manufacturing plants to be optimized. It is thus also possible to carry out a feasibility analysis, i.e. whether a specific product can be produced on an existing machine network plan (which can be very complex) at all.

In a particularly advantageous embodiment, a manufacturing outlay value is assigned to each manufacturing node of the machine network plan, and an optimality criterion, a manufacturing outlay as the sum of the manufacturing outlay values of the manufacturing node involved in the manufacturing sequence, is determined. Quality criteria with regard to the production can thus already be taken into account in a simple manner during the linking. A manufacturing sequence which meets a specific quality criterion can thus be selected for a product. Depending on the desired quality criterion, this can also result in different manufacturing sequences. The flexibility can be increased further if the manufacturing outlay values are provided with weights. A manufacturing outlay value can also change over time, for example, the time required for a manufacturing process step can increase with wear on a manufacturing station, for example wear on a machining tool of a machine tool, in order to ensure consistent quality.

It is particularly advantageous if, during or after the execution of a manufacturing process step at a manufacturing node of the manufacturing sequence, the manufacturing sequence for the product is re-determined by re-linking the product synthesis plan and machine network plan, and the further production of the product is carried out using the new manufacturing sequence. In this way it is possible to react to changes in the machine network, for example a failure of a manufacturing node (also due to maintenance), a changed utilization situation of the manufacturing nodes, etc., during the production of the product. The reliability of manufacture can thus be increased.

Embodiments are directed to a method for producing a product in a manufacturing plant having a number of manufacturing stations, where the product as it is being produced moves between successive manufacturing stations by transport units. The method includes modeling the manufacturing plant with a machine network plan that models the manufacturing plant as a network of manufacturing nodes, wherein a manufacturing node is at least one of a manufacturing station for carrying out a manufacturing process step or a transport unit for moving the product, where the manufacturing nodes in the machine network plan are connected by edges; modeling the product to be produced with a product synthesis plan that models the hierarchical structure of the product in the form of a tree of product synthesis nodes, wherein a product synthesis node is an operation node or a product node, and the product being produced in the manufacturing processes is changed an operation node and product synthesis nodes are connected by edges in the product synthesis plan; and linking the machine network plan and the product synthesis plan with each other to form a manufacturing sequence, the linking including selecting a manufacturing node of the machine network plan for each operation node of the product synthesis plan, wherein the selected manufacturing node carries out the manufacturing process to be carried out at the relevant operation node, and each manufacturing node of the manufacturing sequence is connected to at least one further manufacturing node by at least one edge. The manufacturing sequence in the manufacturing plant is carried out in order to produce the product.

According to embodiments, the machine network plan and the product synthesis plan may be linked in a software based manner and all possible mappings of the product synthesis plan on the machine network plan can be determined in the software-based manner, and one of the possible mappings may be selected as the manufacturing sequence. Further, an optimality criterion can be defined for a manufacturing sequence, and the manufacturing sequence which best meets the optimality criterion can be selected. A manufacturing outlay value is assigned to each manufacturing node of the machine network plan and, as an optimality criterion, a manufacturing outlay can be determined as a sum of the manufacturing outlay values of the manufacturing node involved in the manufacturing sequence. The manufacturing outlay value can be a time or a defined cost value. Further, a weighted sum of the manufacturing outlay values of the manufacturing nodes of the manufacturing sequence can be determined as the manufacturing outlay.

In accordance with other embodiments, during or after execution of a manufacturing process step at a manufacturing node of the manufacturing sequence, the manufacturing sequence for the product can be re-determined by re-linking the product synthesis plan and machine network plan, and a further production of the product may be carried out using a new manufacturing sequence. Further, during or after the execution of a manufacturing process step at each manufacturing node of the manufacturing sequence, the manufacturing sequence for the product can be re-determined.

Embodiments are directed to a manufacturing plant for producing a product. The manufacturing plant includes a number of manufacturing stations and transport units of the manufacturing plant being arranged for manufacturing the product; a machine network plan that models the manufacturing plant as a network of manufacturing nodes, wherein a manufacturing node is at least one of a manufacturing station for carrying out a manufacturing process step or a transport unit for moving the product, where the manufacturing nodes in the machine network plan are connected by edges; and a product synthesis plan that models the product to be produced by modeling a hierarchical structure of the product in the form of a tree of product synthesis nodes, wherein a product synthesis node is an operation node or a product node, and the product is changed by a manufacturing process at an operation node and product synthesis nodes are connected by edges in the product synthesis plan. The machine network plan and the product synthesis plan are linked with each other to form a manufacturing sequence, a manufacturing node of the machine network plan is selected for each operation node of the product synthesis plan, the selected manufacturing node carrying out the manufacturing process to be carried out at a relevant operation node, and each manufacturing node of the manufacturing sequence being connected to at least one further manufacturing node by at least one edge, and the manufacturing plant is controlled to carry out the manufacturing sequence for producing the product.

According to embodiments, the manufacturing plant can further include a plant controller that controls the number of manufacturing stations and the transport units of the manufacturing plant for manufacturing the product. The plant controller can control the manufacturing plant to carry out the manufacturing sequence for producing the product.

In accordance with other embodiments, the manufacturing plant can further include a linking unit. The linking unit can link the machine network plan and the product synthesis plan to each other to form the manufacturing sequence, and the linking unit can select the selected manufacturing node of the machine network plan for each operation node of the product synthesis plan. The manufacturing plant may further include at least one memory. The linking unit can include a processor that executes a set of instructions stored on the at least one memory in a software based manner to link the machine network plan and the product synthesis plan to each other to form the manufacturing sequence.

In accordance with still yet other embodiments, the transport units can transport the product as it is being produced between successive manufacturing stations.

Other exemplary embodiments and advantages of the present invention may be ascertained by reviewing the present disclosure and the accompanying drawing.

BRIEF DESCRIPTION OF THE DRAWINGS

The present invention is explained in more detail below with reference to FIGS. 1 to 10, which show schematic and non-restrictive advantageous embodiments of the invention by way of example. In the drawings.

DETAILED DESCRIPTION

Figure 1:
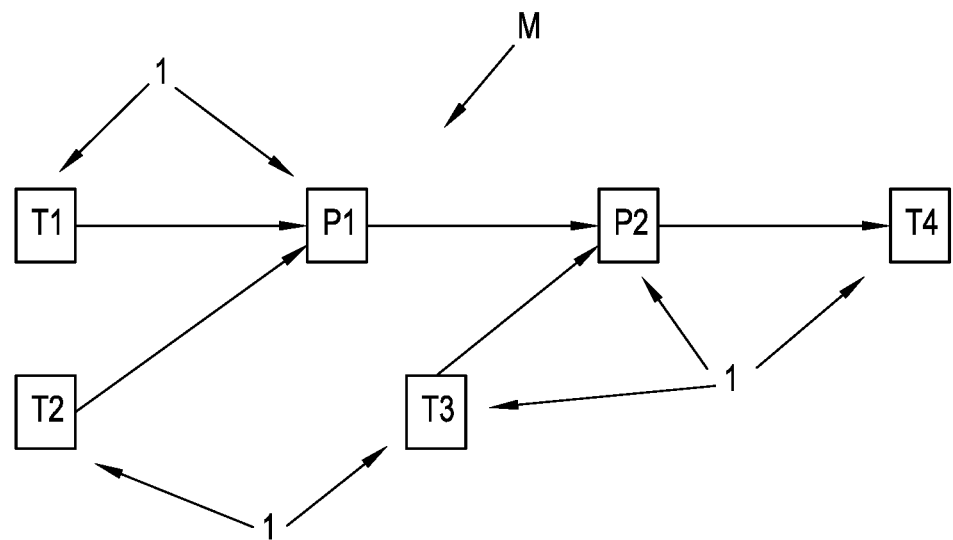
FIGS. 1 to 4 show examples of a machine network plan.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention is based on the fact that an end product is manufactured in a manufacturing plant by a sequence of manufacturing process steps (assembly steps, transformations, etc.) being carried out on intermediate products at manufacturing stations. The transport of an intermediate product between successive manufacturing stations is carried out by transport units. In the following, just "product" is frequently used, with "products" including intermediate products as they pass through the manufacturing installation and the end product produced at the end.

According to the invention, the manufacture of a product is modeled by a product synthesis plan S and a machine network plan M.

The machine network plan M models a manufacturing plant, i.e., the manufacturing hardware available for the manufacture. It should be noted that a factory can contain a plurality of manufacturing plants, and an entire factory can therefore also be mapped by a plurality of machine network plans M. A machine network plan M is modeled as a network of manufacturing nodes 1, whereas a manufacturing node 1 being a manufacturing station and/or a transport unit. The product is acted on and changed at a manufacturing station, for example, by carrying out at least one manufacturing process step on the product. A transport unit implements a transport function in order to move the product through the manufacturing plant. A manufacturing station of the machine network plan M can also contain a transport unit and implement a transport function, in that the manufacturing station implements the onward movement to the next manufacturing node 1 or the collection of the product from a preceding manufacturing node 1. A transport unit can also carry out a manufacturing process step, for example, the step of cooling the product during transport. The connection of the manufacturing nodes 1 of the machine network plan via edges corresponds to the possible flow of the product through the manufacturing installation, whereby an arrow as an edge indicating the possible direction of movement. An edge between two manufacturing nodes 1 means that a product can be moved between these manufacturing nodes 1, either in a specific direction or in both directions. Transport units can be, for example, conveyor belts, robots, linear transport systems such as a long stator linear motor, autonomous vehicles (AGVs), planar motors, etc., in particular any transport systems which enable a product flow. If a manufacturing node 1 can change the product, merge products or divide products, then said node is also referred to as a process node P (manufacturing station or manufacturing station having a transport unit or transport unit having a manufacturing process step). If the manufacturing node 1 performs a pure transport function, said node is also referred to as a transport node T.

An example of a simple machine network plan M is shown in FIG. 1. The example shows a machine network for packaging bottles in a bottle packaging system. The transport node T1 brings filled bottles into the process node P1, in which the bottles are labeled. For this purpose, labels are introduced into the process node P1 by a further transport node T2. The fully labeled bottles are transferred to a packaging machine as process node P2, in which the labeled bottles are packaged. For this purpose, empty cardboard boxes are introduced into the process node P2 by a transport node T3. The finished package is removed from the manufacturing installation via the transport node T4.

The example for the machine network plan M according to FIG. 1 is, of course, very simple. The machine network plan M can, of course, be significantly more complex depending on the manufacturing plant. In particular, a plurality of process nodes P can also be provided, which can carry out the same manufacturing process step. A transport node T and a process node P also do not always have to alternate. Not every present process node P of the machine network plan M has to be used for manufacturing the product. A process node P can also be provided in order to carry out different manufacturing steps, including on different products. It is also possible to incorporate manual workstations into the machine network as process nodes P. In this case, the process step would be carried out by a person, possibly also with the assistance of a robot or machine, with it being possible for the system to automatically create an instruction list for the person with the manufacturing parameters. Likewise, a process node P could also be reached by different routes or via different transport nodes T. A machine network plan M can also be suitable for producing different products. A large number of products, including different products, are usually manufactured simultaneously in a machine network of a manufacturing plant.

Figure 2:
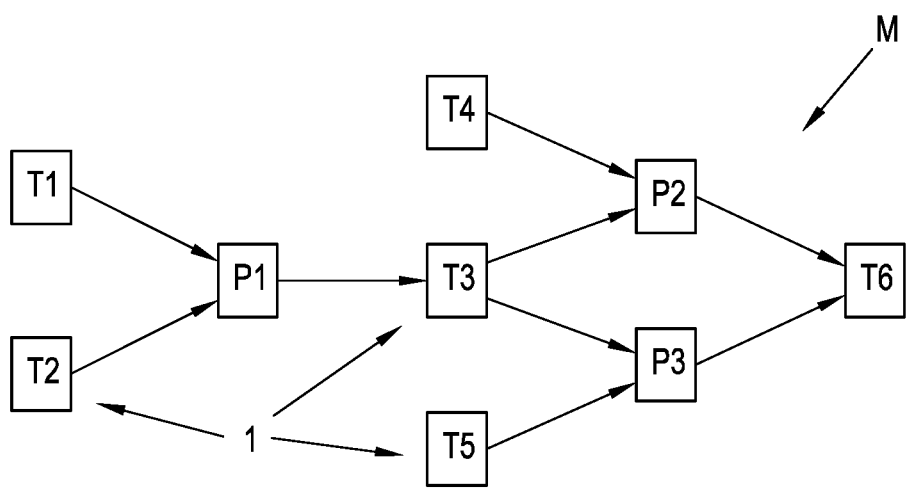

A slightly more complex machine network plan M for packaging bottles is shown in FIG. 2. In this example, a parallelization of the packaging is provided, in which two process nodes P2, P3 are provided as packaging machines. A package, for example a box, is supplied to each of these process nodes P2, P3 via an assigned transport node T4, T5. A transport node T3 divides the product flow of the labeled bottles from the process node P1. The fully packaged bottles are removed by a common transport node T6. Instead of the parallel process nodes P2, P3, these process nodes could also be arranged in series together with suitable transport units, such as long stator linear motors or planar motors.

Figure 3:
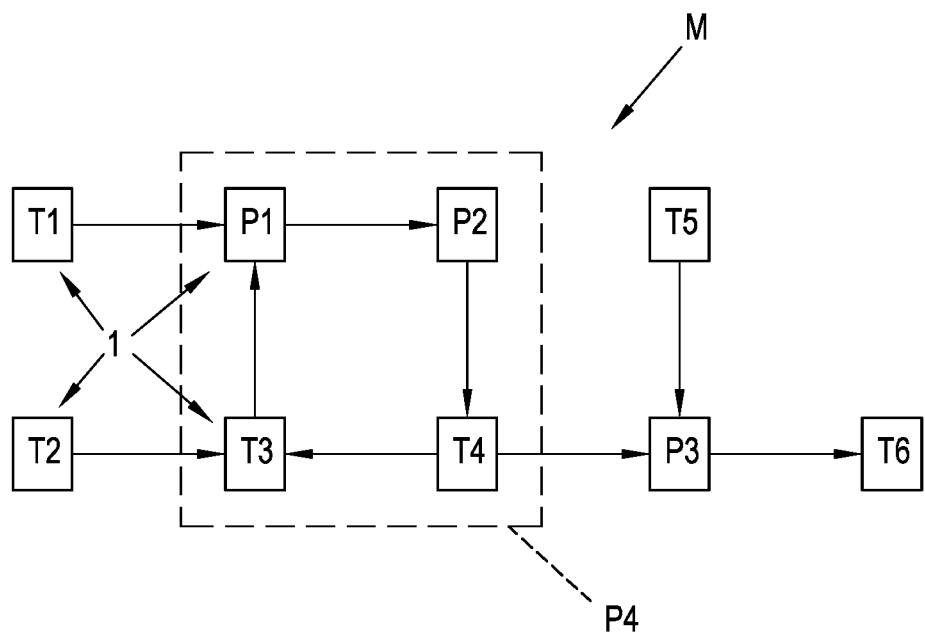

Another example of a machine network plan M is again shown in FIG. 3 using the example of packaging bottles. The bottles labeled in the process node P1 are supplied to a process node P2 in which the bottle is inspected. When the bottle is labeled, the transport node T4 supplies the bottle to the process node P3 in which the packaging takes place. An unlabeled bottle is brought together with the inflow of unlabeled bottles from the transport node T2 via the transport node. A process node does not necessarily have to physically change something about a product, for example the inspection, but can, for example, merely make a change to the data image of the product, for example store the result of the inspection of the product. The manufacturing nodes P1, P2, T3, T4 of FIG. 3 can also be regarded as one manufacturing node P4 (dashed border) in which different processes take place.

It is also conceivable that one transport node T is used for a plurality of process nodes P, i.e. that the product is moved between different process nodes P via the same transport unit. This can be achieved, for example, via long stator linear motors, endless conveyors or planar motors as transport units. An example of this is shown in FIG. 4.

Figure 4:
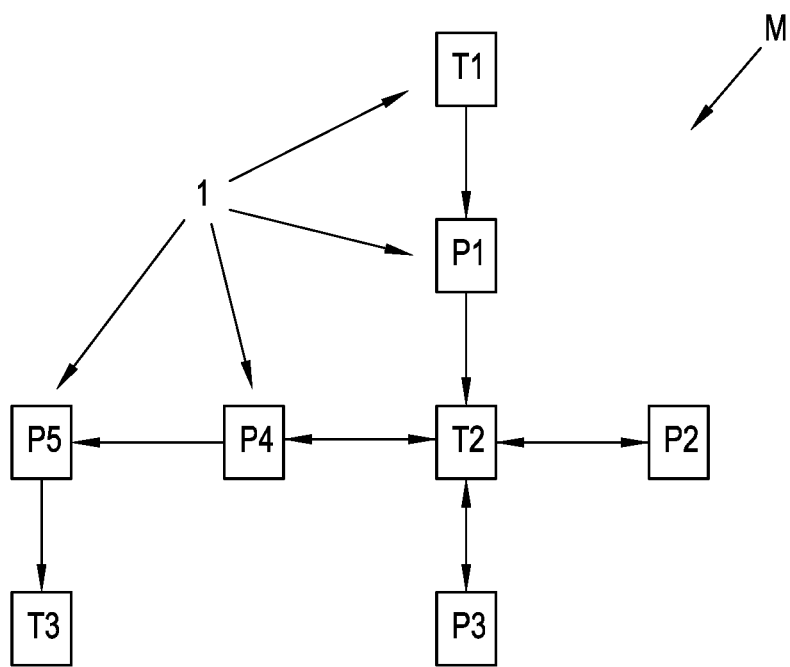

In FIG. 4, the transport node T2 is, for example, a transport unit in the form of a long stator linear motor which connects the process nodes P2, P3, P4. A product is supplied via the transport node T1 and processed in a first process node P1. From there, the product is moved via the transport node T2 to a second process node P2 and is then moved to a third process node P3, and then to a fourth process node P4. The fourth process node P4 also implements a transport function to the subsequent process node P5. Alternatively, the process node P5 could also implement a transport function in order to fetch products from the preceding process node P4. The product can be transported away from the process node P5 via a further transport node T3, for example, a robot.

The modeling of the manufacturing plant via a machine network plan M, as a network of manufacturing nodes 1 and edges, also makes the nesting of machine network plans M possible. For example, a process node P may comprise another machine network plan M. This is indicated in FIG. 3, in which the manufacturing nodes 1 enclosed in dashed lines could be shown as a process node P4, and the process node P4 would in turn be a machine network plan M. In this way, a manufacturing plant can also be modeled hierarchically in a clear manner. This facilitates the handling of machine network plans M which are in particular very large, with a nested machine network plan M, of course, ultimately only being a single machine network plan M.

The product synthesis plan S describes the product itself, in particular the hierarchical structure of the end product as a result of the manufacture using individual intermediate products which are combined in a chain of manufacturing process steps. The product synthesis plan S thus describes with which sub-steps the product is to be produced and which sub-products are to be combined to produce the product. There is a product synthesis plan S for each different product which is to be manufactured in the manufacturing plant or on the machine network plan M. The same products can, of course, use the same product synthesis plan S.

The product synthesis plan S is modelled as a tree of product synthesis nodes 2. The product synthesis nodes 2 of the tree can be product nodes I, which represent the product (intermediate product, end product), or operation nodes O, which convert one product or a plurality of products into another product or a plurality of other products by way of a manufacturing process step. An edge in the tree (connection between nodes) shows the relationship between product synthesis nodes 2 and can also be supplemented with a number to show how many products of the same type an operation node O uses to create a new product.

The product synthesis plan S can begin and end with special operation nodes O. The product synthesis plan S preferably begins with at least one operation source which introduces a product. Such an operation node O has no inlet, but only an outlet for the introduced product. The product synthesis plan S preferably ends with at least one operation sink which represents the end product produced. Such an operation node O has no outlet, but only an inlet. The use of operation sources and operation sinks makes the nesting of product synthesis plans S possible. In this case, an operation source or operation sink, for example, could again comprise a product synthesis plan S, for example, how a bottle is produced, or how a label is printed and die-cut, or how the produced package is further processed.

Figure 5:
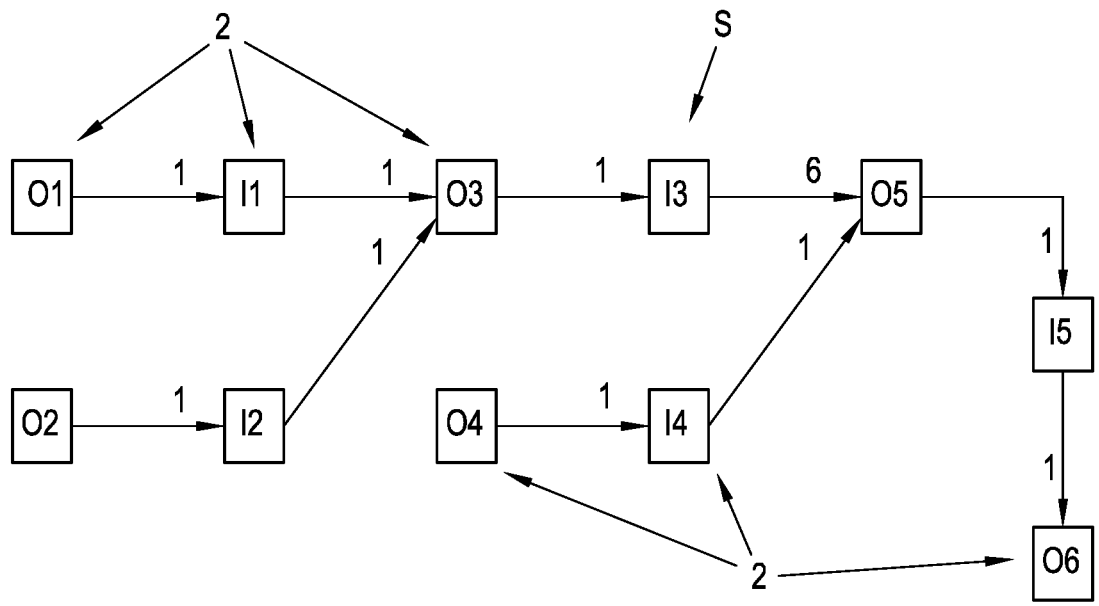
FIGS. 5 and 6 show examples of a product synthesis plan.

An example of a product synthesis plan S is shown in FIG. 5, having a number of product synthesis nodes 2 which are connected by edges. This example shows a product synthesis plan S for a six-pack of labeled bottles. The operation nodes O1, O2, O4 are operation sources and the operation node O6 is an operation sink. The operation node O3 takes a bottle from the operation source O1, which bottle is provided via the product node I1, and takes a label from the operation source O2, which is provided via the product node I2. The operation node O3 produces a labeled bottle which is available via the product node I3. The operation node O5 uses six labeled bottles from the product node I3 and a package from the product node I4, which package is provided by the operation source O4, to produce a package which is present at the product node I5 and is available via the operation sink O6.

Figure 6:
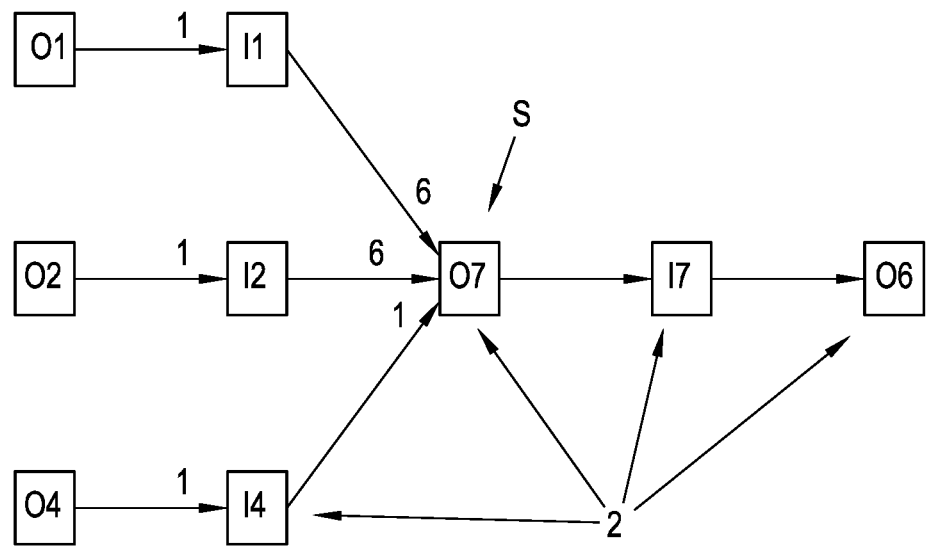

The product synthesis plan S according to FIG. 5 could, of course, also equally be represented in another way, as is shown, for example, in FIG. 6. In FIG. 6, an operation node O7 replaces the operation nodes O3, O5 from the product synthesis plan S in FIG. 5.

The product synthesis plan S also offers another advantage. If the product synthesis plan S is run backward, for example starting at an operation sink, a parts list of the product is obtained, i.e., all of the starting products which are required to produce the product.

The machine network plan M and/or the product synthesis plan S can be created by an application developer. Knowledge of the manufacturing plant(s) is, of course, required for the machine network plan and can be modeled accordingly by manufacturing nodes 1 and edges in the form of a network. A product synthesis plan S can be created for each product to be produced, for example, again by an application developer. Prefabricated product synthesis plans S for different products can also be stored, which product synthesis plans can be retrieved when required. The effort for creating the machine network plan M and a product synthesis plan S therefore, in principle, only arises once.

Figure 7:
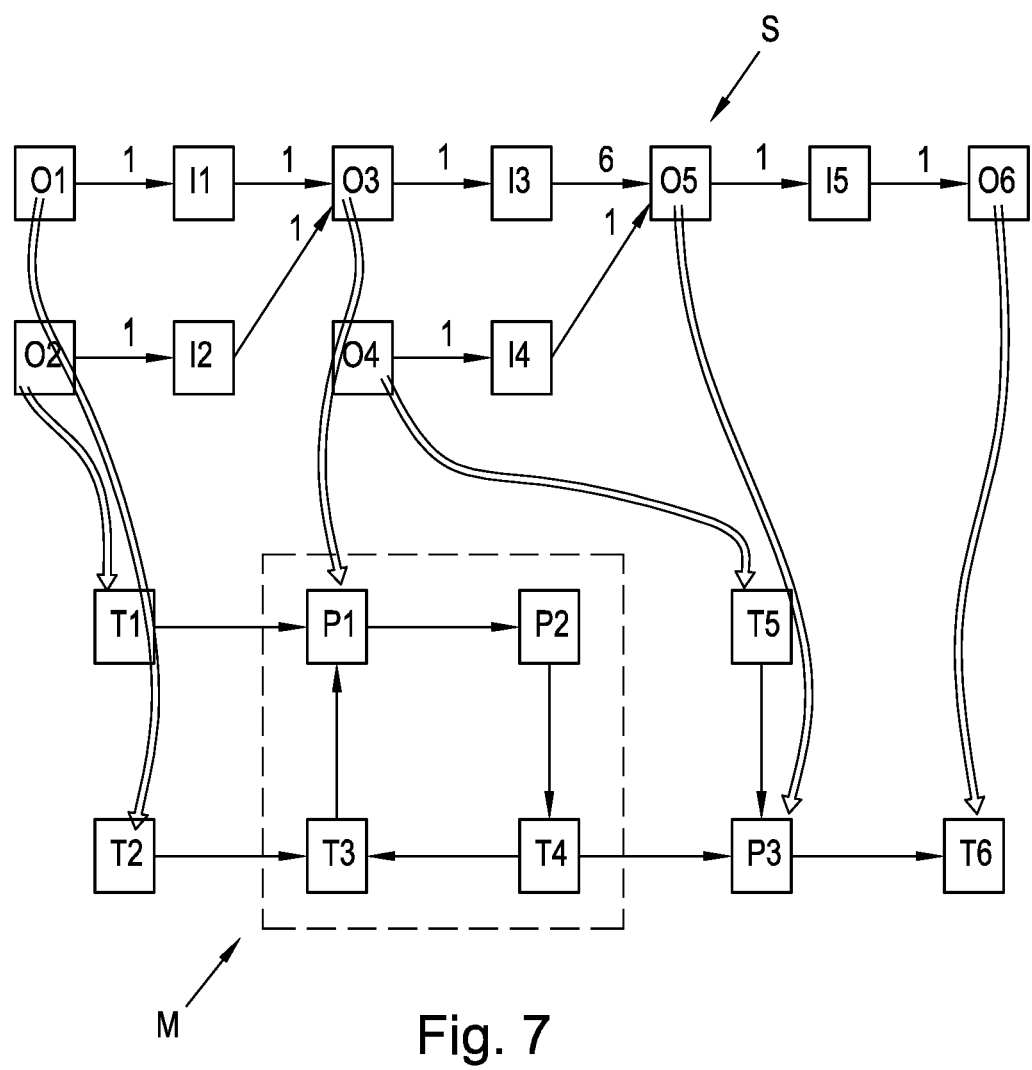
FIG. 7 shows a linking of a machine network plan with a product synthesis plan.

The step which is particularly advantageous is an automated, in particular software-based, linking of the machine network plan M and the product synthesis plan S. In this linking, the operation nodes O of the product synthesis plan S are assigned to available manufacturing nodes 1, in particular transport nodes T and process nodes P, of the machine network plan M, as indicated in FIG. 7 by the arrows between the machine network plan M according to FIG. 3 and the product synthesis plan S according to FIG. 5. A manufacturing node 1 is, of course, assigned to each operation node O during the linking, which manufacturing node can carry out the manufacturing process step, which is required at the relevant operation node O, on the product. Only manufacturing nodes 1 from the machine network plan M that allow a continuous product flow through the machine network plan M via the available transport units (transport node T or process node P with a transport unit) in the manufacturing plant are used in the linking. Essentially, this means that the manufacturing nodes 1 selected in the linking again form a network, the manufacturing nodes 1 of which are connected by edges. The result of the linking is a manufacturing sequence F as a network of manufacturing nodes 1 and edges, with the manufacturing sequence F being a sub-network of the machine network plan M. Each manufacturing node 1 of the manufacturing sequence F is connected to at least one further manufacturing node 1 by at least one edge. A manufacturing sequence F is thus a sequence of manufacturing stations and transport units of the manufacturing plant modeled via the machine network plan M, which sequence is passed through by the product in order to produce the product in the manufacturing plant. In the most trivial, but in practice most unusual, case, the manufacturing sequence F corresponds to the machine network plan M. The manufacturing sequence F is usually a sub-network of the machine network plan M.

There can be a separate manufacturing sequence F for each product to be produced. This means that the same products can be produced in different ways in the manufacturing plant, for example, by way of different manufacturing stations or different transport units. Of course, the same products can also be produced via the same manufacturing sequence F.

If the machine network plan M contains exactly one transport node T or process node P for each operation node O (as in FIG. 7), this assignment is, of course, simple. It is usually the case, however, that a machine network plan M has a plurality of transport nodes T or process nodes P which can be used for a manufacturing process step in the product synthesis plan S, i.e., for an operation node O (as in FIG. 9), and this is what the invention is substantially directed to. For example, a manufacturing process step could be implemented using different available process nodes P of the machine network plan M, or a process node P of the machine network plan M could be reached via different available transport nodes T. In this case, a manufacturing node 1 (process node P or transport node T) of the machine network plan M that carries out the relevant manufacturing process step has to be selected for each operation node O of the product synthesis plan S. In this way, an individual path through the available machine network in the manufacturing plant, which machine network is modeled by the machine network plan M, is determined for each product. This path can also be branched or consist of a plurality of interconnected branches, i.e., said path can generally be a network. This individual network is then the manufacturing sequence F for producing the product, which can then be carried out in the manufacturing plant 12. A manufacturing sequence F created in this way therefore no longer has to be a line, as was previously conventional, but can be any network in the available machine network.

Figure 8:
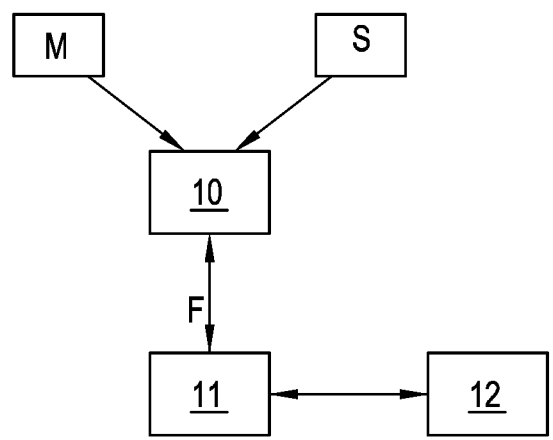
FIG. 8 shows the linking and use of a manufacturing sequence for controlling a manufacturing installation.

This is explained schematically with reference to FIG. 8. A machine network plan M and a product synthesis plan S are supplied to a linking unit 10, in which the machine network plan M and the product synthesis plan S are linked as described. The linking unit 10 is computer hardware and/or computer software. The result is a manufacturing sequence F which is used in a plant controller 11 (computer hardware and/or computer software) of the manufacturing plant 12 in order to control the production of the product in the manufacturing plant 12.

At this point it should be noted that the required data are, of course, also stored for each manufacturing node 1 of the machine network plan M, for example, in the plant controller 11 and/or directly in the manufacturing sequence F, in order to be able to operate the manufacturing node 1 for the relevant product. Such data can be control programs, but also process parameters (which can also be dependent on the relevant product) or the like. The plant controller 11 can thus also access this data in order to control the manufacturing plant 12 accordingly. However, since the specific implementation of the plant controller 11 of the manufacturing plant 12 is not important and the possibilities for this are sufficiently known, it will not be discussed in more detail here.

In the linking step, the linking unit 10 can first check whether a product synthesis plan S can be implemented at all on a machine network plan M. For this purpose, a parts list of all the starting products (operation sources) required for the production of the product (operation sink) can first be determined from the product synthesis plan S, for example. Such a parts list can be determined, for example, such that the product synthesis plan S is run backward, i.e., starting with the product (operation sink). Such a parts list can, of course, already be stored with the product synthesis plan or in a product synthesis plan S. It can then be checked whether each operation source in the product synthesis plan S is provided by a manufacturing node 1 in the machine network plan M. If this is not the case, then the product synthesis plan S cannot be implemented on the machine network plan M.

However, since not every manufacturing node 1 in the machine network plan M is accessible in any way and from every other manufacturing node 1, this check is usually not sufficient. It is therefore also checked whether the manufacturing process steps from the product synthesis plan S can be carried out on manufacturing nodes 1 of the machine network plan M, taking into account the possible transport routes (edges in the network) in the machine network plan M. To this end, the possible mappings of the product synthesis plan S on the machine network plan M can be tested one after the other, for example. This can take place in an automated and software-supported manner, for example by way of what are referred to as known and available SMT (satisfiability modulo theories) solvers (computer hardware and/or computer software). Such a solver determines all possible solutions for the linking or determines that the mapping cannot be executed. A manufacturing sequence F can then be selected from the possible solutions.

Another possibility for carrying out the linking in the linking unit 10 is that of propagating the product synthesis plan S backward. Also in this case, all possible mappings of the product synthesis plan S on the machine network plan M are determined again. In this approach, each intermediate step of the product synthesis plan S is considered individually. Each intermediate step comprises an operation node O which processes a number of intermediate products (upstream product nodes I) in order to produce a product (downstream product node I). As the product synthesis plan S is run backward, the subsequent manufacturing node 1 (target node) in the machine network plan M for each product to be produced via an operation node O is also known, as this manufacturing node has already been established in the previous step. For each operation node O in the product synthesis plan S, it can now be checked whether the intermediate products required for carrying out the current process step of the operation node O for producing the product can be produced in the machine network M, such that the target node in the machine network plan M can be reached simultaneously during production. It is therefore checked whether the known subsequent manufacturing node 1 can be reached from the manufacturing node 1 assigned to the operation node O, i.e., whether, for example, there is an edge between said manufacturing nodes in the machine network plan M. There may, of course, be a plurality of possible implementations in this case. Known approaches (e.g. backtracking algorithms) allow the exhaustive enumeration of all possibilities, from which a possible solution for the linking can then be selected as a manufacturing sequence F.

In principle, any solution could be selected from the possible linking solutions. However, a solution which is optimum according to specific optimality criteria can also be selected from the possible solutions. For this purpose, an optimality criterion is set and the solution which best meets the optimality criterion is selected. In general, the optimality criterion will be a value and the optimality criterion having the minimum or maximum value will be selected.

For the selection of a possible solution in the linking unit 10, a manufacturing outlay value can be assigned to each manufacturing node 1 of the machine network plan M, for example. A manufacturing outlay value can be the time required to carry out a process step or a transport step. However, a manufacturing outlay value can also be a cost value which indicates the costs for a process step or a transport step. The cost value can be a monetary value or an abstract cost value. For example, a cost value for producing a product at a manual workstation could be lower than at a high-performance machine, which, however, has to be retrofitted for this purpose if the number of parts is low. This could be reversed in the case of high numbers of parts. However, a manufacturing outlay value can also be an energy value which indicates the energy, for example electrical energy, to be used for a process step or a transport step. A manufacturing outlay value can also be a utilization value of a specific transport node T or process node S, for example in order to reduce the maintenance intervals or in order to utilize the process nodes S in a uniform manner. Of course, a plurality of different manufacturing outlay values can also be considered simultaneously. A specific manufacturing path F through the machine network plan M thus leads to a manufacturing outlay as the sum of the manufacturing outlay values of the manufacturing nodes 1 involved. If different manufacturing outlay values are taken into account, then these values can be arithmetically linked in any way in order to determine a manufacturing outlay. For example, a weighted sum of the different manufacturing outlay values could be calculated as the manufacturing outlay, with a weight being assigned to, or predetermined for, each manufacturing outlay value. In this case, different manufacturing nodes 1 can be weighted with different weights, and/or different manufacturing outlay values of a manufacturing node 1 can be weighted with different weights. The solution which results in the minimum or maximum manufacturing outlay (optimality criterion) can then be selected from the possible solutions.

This procedure is characterized in that very complex topologies of manufacturing plants 12, i.e., very complex machine network plans M, having complex and variable manufacturing sequences, also having transport routes which have closed loops, switches or freely selectable transport routes, and having a large number of manufacturing nodes 1, can be managed. This also moves away from the previously conventional procedure whereby transport sequences in a manufacturing plant 12 are always in a line. The invention makes it possible to create the manufacturing sequence F for the production of the product in a more flexible manner, and, in particular, to optimize said manufacturing sequence with regard to specific criteria.

The linking unit 10 can also take into account information from the manufacturing plant 12 and/or from the plant controller 11 for the linking, for example, a current utilization or the failure of a process node P or a transport node T.

The manufacturing sequence F for producing the product can be created once and can then be carried out in the manufacturing plant 12 via the plant controller 11. However, it is also conceivable to redetermine the manufacturing sequence F or the remaining part thereof, as described, after each manufacturing node 1 in the machine network plan M, i.e., after the manufacturing process step in the manufacturing node 1 has been completed, or even during the production process step in the manufacturing node 1. In this way, it is possible to react to changed states of the involved manufacturing nodes 1 (process nodes P or transport nodes T) of the machine network plan M in real time. If the utilization of a manufacturing node 1 of a manufacturing plant 12 is too high, for example, or if a manufacturing node 1 has failed, a bypass is automatically searched for in order to produce the product using the manufacturing nodes 1 available in the manufacturing plant 12, via an adapted manufacturing sequence F. A manufacturing node 1 can thus be bypassed in the event of a fault, for example, such that there is no stoppage in the manufacture.

Figures 9, 10:
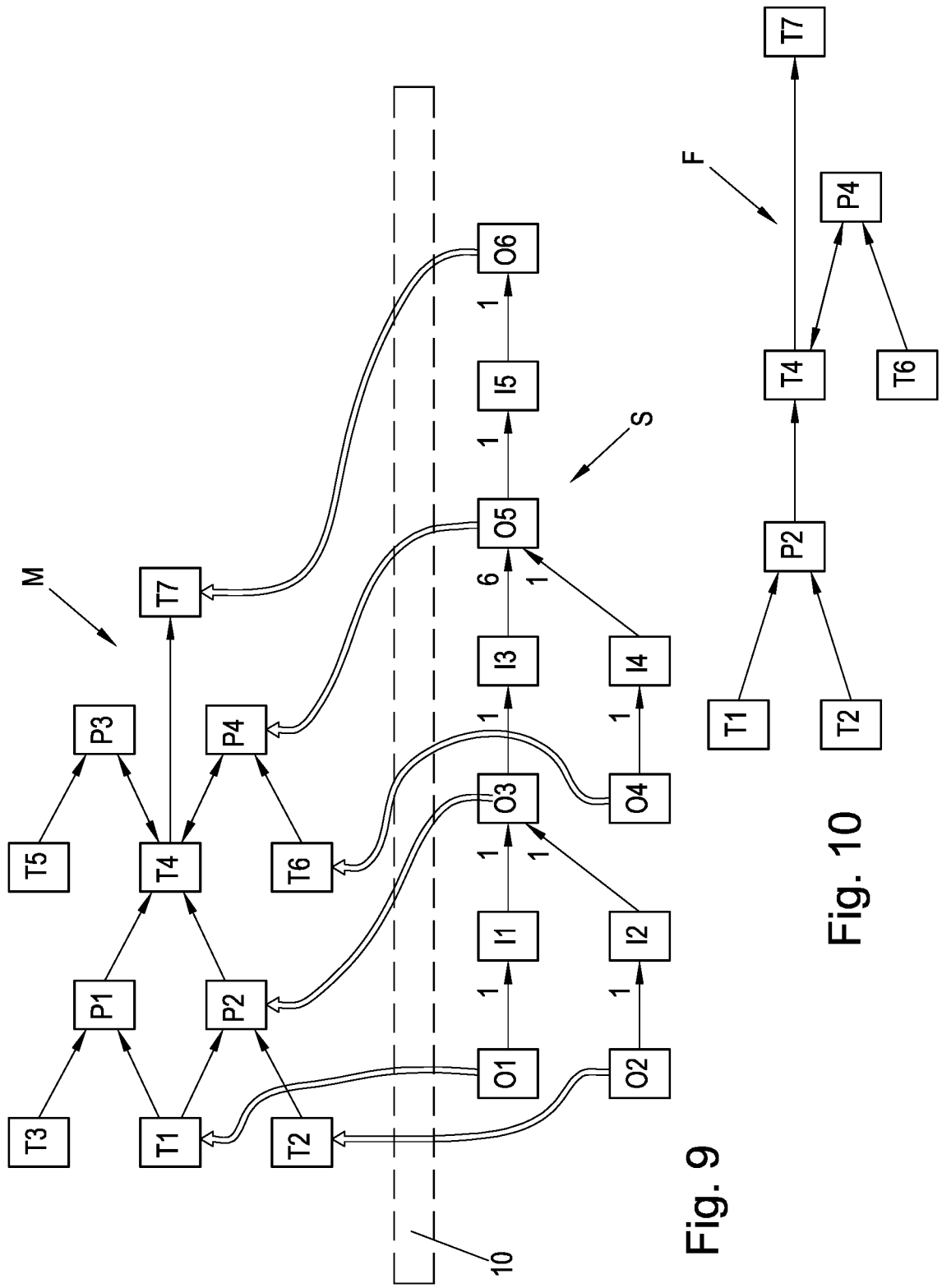
FIG. 9 shows an example of a linking of a machine network plan with a product synthesis plan.
FIG. 10 shows a resulting manufacturing sequence.

The linking is explained in a further example with reference to FIG. 9. A product synthesis plan S, as in FIG. 5, is again used for producing a package of six labeled bottles. In this case, however, the machine network plan M is more complex and comprises parallel manufacturing stations. For example, two labeling stations (process nodes P1, P2) are provided. The two labeling stations receive the unlabeled bottles from the same transport node T1 and receive labels from different transport nodes T2, T3. Two packing stations (process nodes P3, P4) are also provided, each of which receives empty packages from an assigned transport node T5, T6. A transport node T4 connects all of the process nodes P1, P2, P3, P4. Such a transport node T4 is, for example, a transport unit in the form of a long stator linear motor having switches which connect different transport paths of the long stator linear motor. The transport node T4 also transports the finished package to the transport node T7, at which the finished package is removed from the manufacturing plant.

As a result of the linking (indicated by the linking unit 10), a suitable manufacturing node 1 from the machine network plan M is assigned to each operation node O of the product synthesis plan S. For example, the operation source O1, which represents the introduction of the unlabeled bottle, is assigned to the transport node T1 of the machine network plan M, by which an unlabeled bottle is supplied. The same applies to the operation source O2 and the transport node T2 for supplying a label. Instead of the transport node T2, however, the transport node T3, which performs the same task, could also have been selected. For carrying out the manufacturing process step of labeling, the two process nodes P1, P2, which are both suitable for this manufacturing process step, are possible. However, only the process node P2 can be selected because the process node P1 cannot be reached by the already selected transport node T2, since the transport node T2 is not connected to the process node P via an edge and there is therefore no transport route between these two manufacturing nodes. Different manufacturing nodes, specifically the transport nodes T5, T6 and the process nodes P3, P4, could again be selected for the operation nodes O4 and O5. If, however, the transport node T6 is selected, then the process node P4 is preferably selected, since this is the shortest transport route (which can be described, for example, by a corresponding manufacturing outlay value for the transport time or for the transport route). The process node P3 could however also be used because it can be reached from the transport node T6 via the transport node T4, only that would mean a longer transport route and a longer transport time. If a manufacturing outlay is determined for these two possibilities, then the process node P4 will probably be selected. The result of the linking is a manufacturing sequence F, as shown, for example, in FIG. 10. This example illustrates that there can be different manufacturing sequences F for a product synthesis plan S in the machine network plan M. The manufacturing sequence F can also be changed in real time. If, for example, the process node P4 fails or the utilization of the process node P4 is too high, the operation nodes O4, O5 can be mapped to the transport node T5 and process node P3, for example. This can also be done for each individual product, which means that a product can be manufactured very flexibly.

The invention can also, however, be used to simulate a manufacturing plant 12, for example in order to redesign a manufacturing plant 12, in order to optimize by substituting manufacturing nodes 1, in order to check whether a product can be produced in an existing manufacturing plant 12, or in order to reduce the costs of producing a product in a manufacturing plant 12, etc. Only a machine network plan M and a product synthesis plan S are required for the simulation. In this case, the determined manufacturing sequence F is not carried out in the real manufacturing plant 12 and a real product is not produced, but rather a fictitious product. Alternatively, the manufacturing plant could also be simulated (what is referred to as a digital twin) and the determined manufacturing sequence F could be carried out in the simulated manufacturing plant. For this purpose, the manufacturing nodes 1 involved in producing the product are replaced in the simulation by suitable mathematical simulation models which simulate the real behavior of the manufacturing nodes 1.

The simulation can therefore be used to produce a fictitious product in a fictitious, simulated manufacturing plant. In this case, the sequence is the same as in the production of a real product in a real manufacturing plant.

Memory (not shown), e.g., a non-transitory computer readable medium or media, can be provided to store sets of instructions that can be executed by a processor to perform any of the methods or computer based functions disclosed herein, either alone or in combination with the other described devices. The memory, accessible by a processor for linking unit 10, can include a set of instructions to link the machine network plan with the product synthesis plan in linking unit 10. The memory can be stored in linking unit 10 or remote from the linking unit 10, e.g., a remotely located server, memory, system, or communication network or in a cloud environment. Further, the above-identified memory or one or more separate memories can be provided to store a set of instructions that can be executed by a processor of plant controller 11 to perform any of the methods or computer based functions disclosed herein, either alone or in combination with the other described devices. Further, the above-identified memory or one or more separate memories, accessible by a processor for plant controller 11, can include a set of instructions to perform the production process in the manufacturing plant in accordance with the linked machine network plan and the product synthesis plan. This memory can be stored in plant controller 11 or remote from plant controller 11, e.g., a remotely located server, memory, system, or communication network or in a cloud environment.

Moreover, in addition to the foregoing, it is to be understood and those skilled in the art will readily appreciate that plant controller 11 can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. Further, plant controller 11 can be formed as application specific integrated circuits (ASICs) or other programmable integrated circuits, which can be implemented by microprocessors or similar structures, and can be programmed using software (e.g., microcode) to perform various functions discussed herein and may optionally be driven by firmware and/or software. Alternatively, plant controller may be implemented by dedicated hardware, or as a combination of dedicated hardware to perform some functions and a processor (e.g., one or more programmed microprocessors and associated circuitry) to perform other functions, including controlling the manufacturing plant according to the stored sets of instructions, including according to the linked machine network plan with the product synthesis plan.

What is claimed:

1. A method for producing a product in a manufacturing plant having a number of manufacturing stations, the product as it is being produced moving between successive manufacturing stations by transport units, the method comprising:
    modeling the manufacturing plant with a machine network plan that models the manufacturing plant as a network of manufacturing nodes, wherein a manufacturing node is at least one of a manufacturing station for carrying out a manufacturing process or a transport unit for moving the product, where the manufacturing nodes in the machine network plan are connected by at least one manufacturing edge;
    modeling the product to be produced with a product synthesis plan that models a hierarchical structure of the product in a form of a tree of product synthesis nodes, wherein a product synthesis node is an operation node or a product node, and the product being produced in the manufacturing processes is changed at the operation node and product synthesis nodes are connected by synthesis edges in the product synthesis plan; and
    linking the machine network plan and the product synthesis plan with each other to form a manufacturing sequence, the linking including selecting one of the manufacturing nodes of the machine network plan for each of the operation nodes of the product synthesis plan, wherein the selected one of the manufacturing nodes carries out the manufacturing process to be carried out at a relevant operation node, and, in the manufacturing sequence, each of the manufacturing nodes is connected to at least one further manufacturing node by at least one manufacturing edge,
    wherein the manufacturing sequence in the manufacturing plant is carried out in order to produce the product.

2. The method according to claim 1, wherein the machine network plan and the product synthesis plan are linked in a software based manner and wherein all possible mappings of the product synthesis plan on the machine network plan are determined in the software-based manner, and one of the possible mappings is selected as the manufacturing sequence.

3. The method according to claim 2, wherein an optimality criterion is defined for a manufacturing sequence, and the manufacturing sequence which best meets the optimality criterion is selected.

4. The method according to claim 3, wherein a manufacturing outlay value is assigned to each manufacturing node of the machine network plan and, as an optimality criterion, a manufacturing outlay is determined as a sum of the manufacturing outlay values of the manufacturing node involved in the manufacturing sequence.

5. The method according to claim 4, wherein the manufacturing outlay value is a time or a defined cost value.

6. The method according to claim 4, wherein a weighted sum of the manufacturing outlay values of the manufacturing nodes of the manufacturing sequence is determined as the manufacturing outlay.

7. The method according to claim 1, wherein, during or after execution of a manufacturing process step at a manufacturing node of the manufacturing sequence, the manufacturing sequence for the product is re-determined by re-linking the product synthesis plan and machine network plan, and a further production of the product is carried out using a new manufacturing sequence.

8. The method according to claim 7, wherein, during or after the execution of a manufacturing process step at each manufacturing node of the manufacturing sequence, the manufacturing sequence for the product is re-determined.

9. A manufacturing plant for producing a product, comprising:
    a number of manufacturing stations and transport units of the manufacturing plant being arranged for manufacturing the product;
    wherein a machine network plan is provided that models the manufacturing plant as a network of manufacturing nodes, wherein a manufacturing node is at least one of a manufacturing station for carrying out a manufacturing process or a transport unit for moving the product, where the manufacturing nodes in the machine network plan are connected by at least one manufacturing edge;
    wherein a product synthesis plan is provided that models the product to be produced by modeling a hierarchical structure of the product in a form of a tree of product synthesis nodes, wherein a product synthesis node is an operation node or a product node, and the product is changed by a manufacturing process at an operation node and in the product synthesis plan, the product synthesis nodes are connected by synthesis edges,
    wherein the machine network plan and the product synthesis plan are linked with each other to form a manufacturing sequence,
    wherein one of the manufacturing nodes of the machine network plan is selected for each operation node of the product synthesis plan, the selected one of the manufacturing nodes carrying out the manufacturing process to be carried out at a relevant operation node, and, in the manufacturing sequence, each of the manufacturing nodes is connected to at least one further manufacturing node by at least one manufacturing edge, and
    wherein the manufacturing plant is controlled to carry out the manufacturing sequence for producing the product.

10. The manufacturing plant according to claim 9, further comprising a plant controller that controls the number of manufacturing stations and the transport units of the manufacturing plant for manufacturing the product.

11. The manufacturing plant according to claim 10, wherein the plant controller controls the manufacturing plant to carry out the manufacturing sequence for producing the product.

12. The manufacturing plant according to claim 9, further comprising a linking unit,
    wherein the linking unit links the machine network plan and the product synthesis plan to each other to form the manufacturing sequence, and
    wherein the linking unit selects the selected manufacturing node of the machine network plan for each operation node of the product synthesis plan.

13. The manufacturing plant according to claim 12, further comprising at least one memory,
    wherein the linking unit comprises a processor that executes a set of instructions stored on the at least one memory in a software based manner to link the machine network plan and the product synthesis plan to each other to form the manufacturing sequence.

14. The manufacturing plant according to claim 9, wherein the transport units transport the product as it is being produced between successive manufacturing stations.

* * * * *